Sept. 11, 1923.
J. W. KAISER
DEVICE FOR INFLATING TIRES AND THE LIKE
Filed Dec. 20, 1920
1,467,671
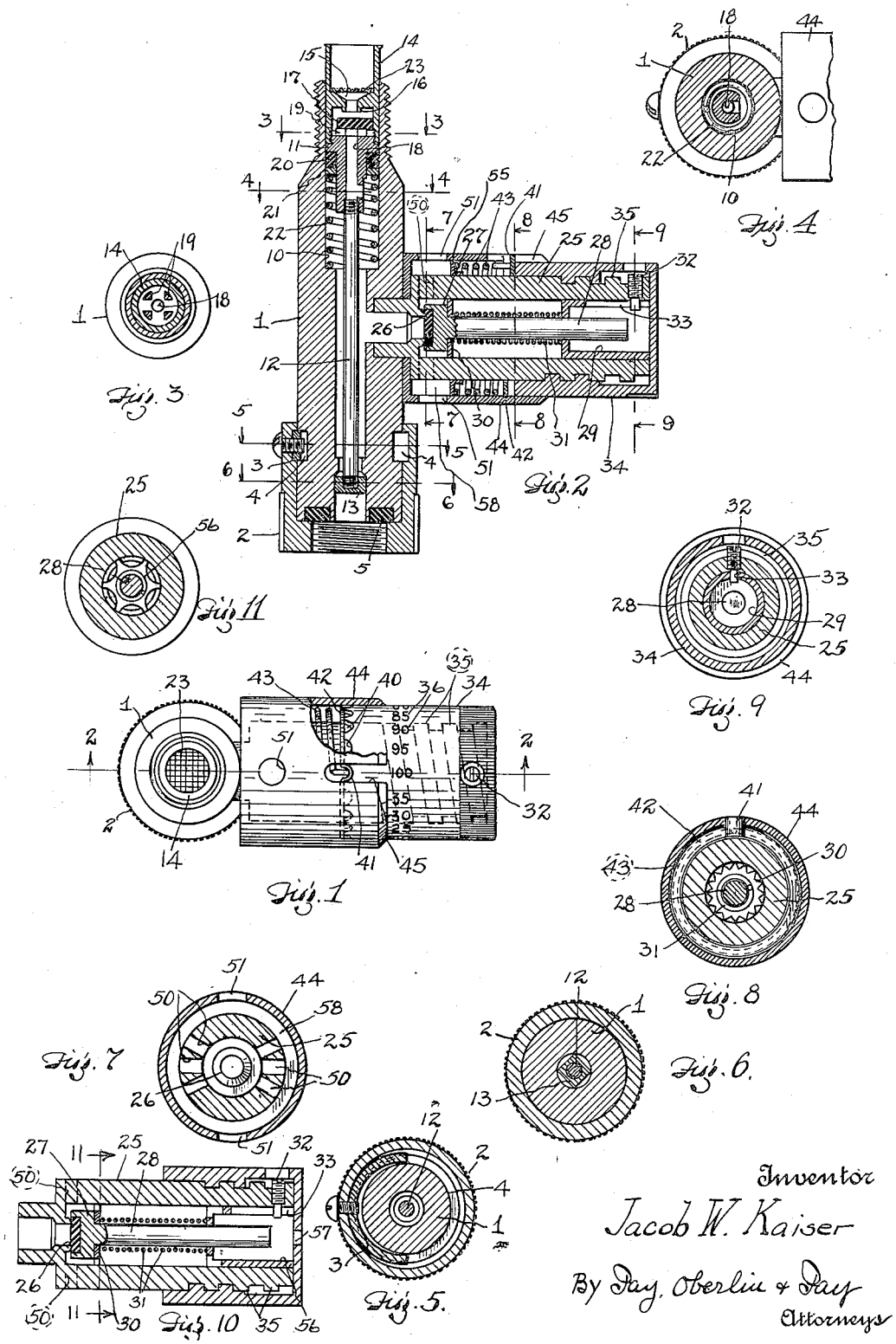

Patented Sept. 11, 1923.

1,467,671

UNITED STATES PATENT OFFICE.

JACOB W. KAISER, OF CLEVELAND, OHIO.

DEVICE FOR INFLATING TIRES AND THE LIKE.

Application filed December 20, 1920. Serial No. 431,865.

*To all whom it may concern:*

Be it known that I, JACOB W. KAISER, a citizen of the United States, and a resident of Cleveland, county of Cuyahoga, and State of Ohio, have invented a new and useful Improvement in Devices for Inflating Tires and the like, of which the following is a specification, the principle of the invention being herein explained and the best mode in which I have contemplated applying that principle, so as to distinguish it from other inventions.

The present improvements, relating, as indicated, to tire inflating devices, have more particular regard to a device of this sort in which a pressure release valve is utilized so as to prevent an excessive pressure being produced within the tire or other article being inflated. It will be understood that nothing herein is to be taken as implying a limitation of the use of the device to any particular field, such as the one just referred to, but such device may be used in connection with supplying air or other fluid under pressure into any receptacle, where it is desired to automatically limit the pressure thus supplied to a predetermined degree irrespective of the pressure available in the supply line.

In order to adapt the device in hand for use in inflating tires, a check valve is also incorporated therein, which, upon inward movement, is adapted to unseat the familiar Schrader tire valve employed on tires, and at the same time be air-tight so as not to allow any air to escape in such unseating operation. Other more general objects include the provision of means to produce a distinct sound to serve as a signal when the predetermined pressure is reached in the tire or other receptacle being filled, and the construction of the pressure release means proper, so that the latter will be self-contained and extremely compact as well as easy to calibrate.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Fig. 1 is an end elevation of my improved device with a portion broken away to illustrate an interior detail; Fig. 2 is a central sectional view of such device, the plane of the section being indicated by the line 2—2, Fig. 1; Figs. 3 to 9 inclusive are transverse sections thereof taken on the planes indicated by the lines 3—3, 4—4, etc., Fig. 2; and Figs. 10 and 11 are respectively a central section corresponding with that of Fig. 2, and a transverse section corresponding with that of Fig. 8, but showing a modified construction of a detail of the pressure release device proper.

The particular device illustrated embodies features hereinbefore referred to, as well as others to be mentioned, which adapt it particularly for use in inflating the tires of automobiles and the like. Thus the tubular member 1 which constitutes the main body of the device is provided at its one end with an internally threaded coupling 2 adapted to engage the end of a tire nipple or any similar threaded device connected with the receptacle (tire or what not) that is to be inflated. This coupling is rotatably secured to the body 1 through the medium of a semicircular key 3 of the form shown in Fig. 5 that is attached to the coupling at its midpoint, and has its free ends slidably engaging an annular recess 4 in the body. A washer 5, of rubber or like resilient material, is inset in the portion of the body end exposed within said coupling, against which the end of the valve nipple is drawn to effect a tight connection between the same and the body 1.

Slidably held in an enlarged portion 10 of the bore or opening of said main body 1 is a return pressure check-device or member 11, provided with a stem 12 that is disposed axially of such bore and extends to a point adjacent the end that is provided with the aforesaid coupling 2. Such stem end is fitted with a head 13 of square or like angular form that serves to guide the stem properly in the bore while still permitting the free passage of air therethrough.

The opposite end of the body, wherein the enlarged portion 10 of the bore is located, is externally threaded so as to adapt the same to receive an internally threaded coupling such as is usually provided on the end of the flexible tube from a pump. For the purpose of making connection with the type of coupling usually employed on air-lines supplied from a storage tank, such coupling, where it is directly applied to the tire valve, being simply pressed against the same and thus unseating a check valve within the coupling, I provide a tubular extension 14 on the device 11, such extension projecting beyond the valve body, as shown in Fig. 2, into position to engage with the coupling of the type just mentioned, in the same fashion as the end of the ordinary tire valve would engage therewith. This extension is provided with a partition 15 having a constricted central opening and a raised lip 16 around such opening on its inner face. Against the latter a rubber disc 17, loosely held in the space between such partition and the adjacent end of the device 11, is adapted to seat and form a closure whenever the pressure fluid flows in a reverse direction through the central opening 18 in said device. Such opening 18 extends to a point beyond the inner end of the device 11, and then opens laterally into the bore of the main body, the disc 17 just referred to above being prevented from sealing the admission of air through the opening to the body by a plurality of lugs 19 on the outer face of the device.

The device or member 11 carries a compressible washer or gasket 20, just back of its head, that is held in place by a loose washer 21 and a compression spring 22 interposed between such washer and the shoulder that marks the inner end of the enlarged portion 10 of the bore in main body 1. The effect of pressing inwardly on the extension 14, as is involved in making a connection with the corresponding end of said main body, whether directly or through an internally threaded coupling, is to compress the washer 20 which is thus caused to expand sufficiently to tightly seal the device in the enlarged portion 10 of the bore. At the same time the head 13 on the opposite end of the stem 12 will be forced into engagement with the stem of the tire valve so as to open the latter and permit the air to enter freely therein. A screen 23 is desirably inserted in the tubular extension 14 to prevent dust or dirt being carried into the interior of the body 1 and thus into the tire valve.

The pressure release mechanism is housed in a lateral extension 25 that is either actually or in effect integrally attached to the main body 1, such housing being formed with a central opening that communicates at its inner end with the bore or passage in said main body 1. An outwardly facing valve seat 26 is formed near the inner end of the opening in housing 25, and co-operative therewith is a valve 27 formed with a stem 28 that is slidably guided in a hollow member 29 that is in turn slidably held in the opening in the housing. The inner end of the valve stem is provided with a corresponding serrated guide washer 30 located just back of the valve head proper, and a compression spring 31 that is interposed between said washer and the member 29 serves normally to hold said valve against seat 26, as will be readily understood.

The hollow member 29 is held against rotation in the opening in housing 25 by means of a set screw 32 in such housing, the inner end of which engages a longitudinal slot 33 in said member. The position of said member longitudinally of the opening is adjusted by means of a cap 34 which is interiorly threaded to engage the relatively steep threads 35 formed in the exterior surface of the housing 25. The end of this cap bears against the hollow member 29, and, upon rotation in one direction or the other, will force the latter inwardly, or allow it to move outwardly a predetermined amount against the compression spring 31. The pressure of air or other fluid within the main body 1 and the communicating opening in housing 25 that will cause the valve to unseat will vary according to the spring pressure back of the valve 27, and, by means of suitable calibrated markings 36 on the exterior of cap 34, the pressure at which the valve will thus release may be accurately indicated.

The edge of the skirt of the cap 34 is formed with a series of serrations 40, as best shown in Fig. 1, which correspond with the markings 36 just referred to, such serrations being arranged for engagement by a shoulder 41 on a ring 42 held against the edge in question by a compression spring 43 resting on a shelf 55. The serrated edge of the cap with such ring and spring is enclosed by a supplemental housing 44 that is secured to the main body in any suitable manner, such supplemental housing being notched at one point 45 in line with the shoulder 41 on ring 42 so as to provide an index for the pressure designations 36 on the cap. The shelf 55, while supporting spring 43, also forms an air chamber 58 with the outlets 51 that produces the sound.

To provide for the escape of the air when valve 27 releases, lateral openings 50 are formed in the housing 25 just near the valve seat 26, and other openings 51, more or less aligned therewith, are formed in the supplemental housing 44. The air, as it escapes past the valve seat upon the raising of valve 27, is accordingly diverted and caused to pass through openings 50 into the chamber 58, and through openings 51.

In dealing with the relatively higher pressures in inflating the heavy pneumatic tires now being used on trucks, in order accordingly to reduce the pressure of the air as it passes through openings 50 and 51, I may modify the construction of the release device as shown in Figs. 10 and 11, to provide additional outlet for the air. To this end, for a hollow member 29 with closed inner end, I substitute a member 56 that is provided with a number of apertures in such inner end, thus permitting the major portion of the air, when valve 27 is raised, to escape through an opening 57 provided in the end of cap 34.

The general operation of the device should be sufficiently clear from the description heretofore given of the operation of its several component parts. When the device is used to inflate a tire for example, it is secured onto the familiar tire valve by means of coupling 2, and then constitutes in effect a continuation of such tire valve. The hose connection from pump or storage tank is then either coupled onto the opposite end of the main body 1 or pressed against same, depending upon the type of coupling provided, and as a result the slidable device or member 11 is forced inwardly causing the head 13 on the valve stem 12 to unseat the tire valve, and air under pressure accordingly is free to enter the tire. When, however, the desired pressure is reached, as determined by the setting of the cap 34 on the pressure release device proper, the valve 27 in the latter is unseated. Upon uncoupling the pump or the storage tank line from the main body 1, the device 11 is moved into its outer position by the spring 22, thus allowing the tire valve to close, and at the same time the valve 17 in the tubular extension of such device seals the main body against escape of air from within, and thus prevents any deflation of the tire before the tire valve is completely seated.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of a main body provided with a coupling at one end adapted to secure the device to a tire-valve or the like; a longitudinally displaceable member in said body having an extension normally projecting beyond the other end of said body; and an inwardly opening check valve carried by said displaceable member.

2. In a device of the character described, the combination of a main body provided with a coupling at one end adapted to secure the device to a tire-valve or the like; a longitudinally displaceable member in said body having an extension normally projecting beyond the other end of said body; said member including a compressible section adapted to seal said member in said body; a compression spring co-acting with said member thus to seal same; and an inwardly opening check valve carried by said displaceable member.

3. In a device of the character described, the combination of a main body provided with a coupling at one end adapted to secure the device to a tire-valve or the like; a longitudinally displaceable member in said body having an extension normally projecting beyond the other end of said body; an inwardly opening check valve carried by said displaceable member; and a member operatively connected with said displaceable member and adapted to open such tire-valve when said displaceable member is moved inwardly.

4. In a device of the character described, the combination of a body provided with an internally threaded coupling at one end adapted to secure the device to a tire or the like, the other end of said body being externally threaded; a longitudinally displaceable member in said body having an extension normally projecting beyond such threaded end of said body; an inwardly opening check valve carried by said member; and a stem attached to said member and adapted to open such tire-valve when said member is moved inwardly.

5. In a device of the character described, the combination of a main body provided with a coupling at one end adapted to secure the device to a tire-valve or the like; a longitudinally displaceable member in said body having an extension normally projecting beyond the other end of said body, said member including a compressible section adapted to seal said member in said body; a compression spring co-acting with said member thus to seal same; an inwardly opening check-valve carried by said member; and a stem attached to said member and adapted to open such tire-valve when said member is moved inwardly.

6. In a device of the character described, the combination of a main body provided with a coupling at one end adapted to secure the device to a tire-valve or the like; a longitudinally displaceable member in said body having an extension normally projecting beyond the other end of said body; an inwardly opening check-valve carried by said displaceable member; and a safety valve in communication with the interior of said body.

Signed by me, this 11th day of December, 1920.

JACOB W. KAISER.